Patented May 2, 1933

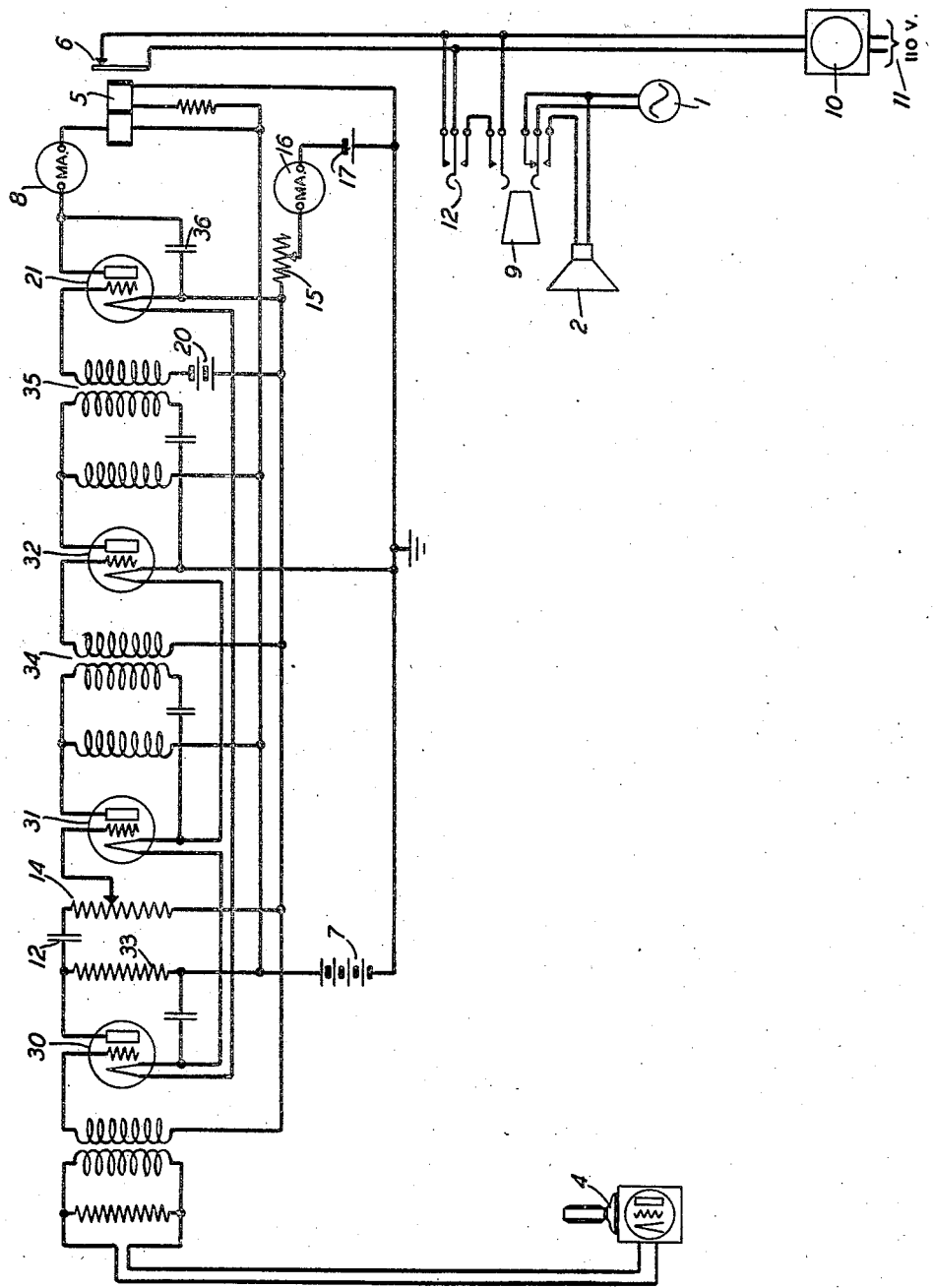

1,907,112

UNITED STATES PATENT OFFICE

FRANCIS L. HOPPER, OF PASADENA, CALIFORNIA, ASSIGNOR TO ELECTRICAL RESEARCH PRODUCTS, INC., OF NEW YORK, N. Y., A CORPORATION OF DELAWARE

APPARATUS FOR MEASURING REVERBERATION TIME

Application filed July 13, 1931. Serial No. 550,376.

This invention relates generally to measuring systems and more particularly to devices for determining the acoustic conditions of enclosed and open spaces.

The principal object of this invention is to provide a precision method of and apparatus for measuring the reverberation time of closed and open spaces and the rate of decay of sound energy in said spaces. Reverberation time, as usually defined, is the interval elapsing while the average sound intensity of the residual sound decays 60 decibels or, in other words, from any given value to one one-millionth of that value.

In accordance with this invention a sound detector circuit controls a cycle counter which remains in operation after the source of sound is cut off until the residual sound level has fallen a predetermined amount. The time of decay may then be determined from the reading on the cycle counter knowing the frequency of the power supply used to operate it or the cycle counter may be calibrated to give the time of decay directly.

In accordance with another feature of the invention there is provided a gain control whereby the current entering the detector circuit may be varied in predetermined steps to vary the time of operation of the cycle counter in order that a series of readings may be taken to indicate the rate of decay of the residual sound from a given source.

In the drawing, 1 represents an oscillation generator for supplying a loud speaker 2 with energy of the desired constant or warble frequency. This energy is picked up by a condenser type transmitter 4 (usually associated with its own amplifier) amplified by suitable amplifiers 30, 31 and 32, then rectified by a rectifier 21, and finally energizes the operating winding of a relay 5 to open contact 6. The opening of contact 6 causes a cycle counter to begin to operate and will remain in operation until relay 5 releases closing contact 6 due to the falling off of the sound currents to a predetermined level.

As shown in the drawing the amplifiers 30 and 31 are coupled by means of the resistance 33 and the condenser 12, and bridged across the input of amplifier 31 is a potentiometer 14 the purpose of which is hereinafter described. Amplifiers 31 and 32 are coupled by means of a transformer 34, and the amplifier 32 is coupled to the rectifier 21 by means of a transformer 35. Obviously any number of stages of amplification may be used which will give sufficient energy range for the proper operation of this device. In series with the input of the rectifier 21 is a battery 20 which places a large negative bias upon its grid so that a certain amount of input is necessary to cause relay 5 in its plate circuit to operate. This is done in order that the effect of ordinary room noise is overcome to some extent. Thus it is possible to take measurements in the presence of a moderate amount of noise.

As shown in the drawing a capacity 36 is provided between the filament and the plate of the rectifier 21 for the purpose of by-passing the alternating current component of the sound currents in the detector output and also to prevent chattering in the relay 5. Relay 5 is a polarized relay having a biasing winding and an operating winding. A battery 7 is connected to the biasing winding of relay 5 in such a way as to provide rapid contact when the current in the operating winding has decreased to a predetermined value. A milliammeter 8, is connected in the plate circuit of the rectifier 21 for the purpose of observing current changes in the circuit during the period of measurement. A battery 17 supplies the amplifiers 30, 31, 32 and the rectifier 21 with filament current. In series with the battery 17 are an adjustable resistance 15 and a milliammeter 16 which are used in the adjustment of the device.

A switch 9 is provided for energizing the loudspeaker 2 and also for disconnecting and short-circuiting the loudspeaker 2 and simultaneously opening a circuit to by-pass the relay contact 6 thus starting the operation of a cycle counter 10 which remains in operation until the sound level due to reverberation has fallen to the predetermined level at which time relay 5 will release to close contact 6.

As shown in the drawing a three-way key 12 is provided which is held down during the determination of the reverberation time of the space under test. As will hereinafter be described, the key is placed in its central position during the calibration of the device prior to the running of the test. The upper contact is for the purpose of shorting out the cycle counter 10 so that it may be adjusted and set. In the circuit containing the cycle counter 10 is a source of constant frequency alternating current power supply 11.

A suitable level of acoustic energy is chosen according to the nature of the space under test, the amount of extraneous noise, the capacity of the loudspeaker, etc. With key 12 left in its central position not touching either the top or bottom contacts the amplifiers 30, 31 and 32 are adjusted by means of the potentiometer 14 so that the gain control is on its minimum step. Switch 9 is then operated to close the circuit containing the loudspeaker 2 and the oscillator 1 thus causing a tone to come from the loudspeaker 2. The sound energy in the space to be tested is then brought to a steady state. This energy, emitted by the loudspeaker 2, is picked up by the transmitter 4, amplified by the amplifiers 30, 31 and 32 and rectified by rectifier 21; and if the input is sufficient, it energizes relay 5 to open contact 6. The oscillator 1 is then adjusted until the input is just sufficient to energize relay 5 to open contact 6 thus causing the cycle counter 10 to begin to count. When the input to the loudspeaker 2 has been satisfactorily adjusted switch 9 is then released.

The microphone circuit has by the above means been so prepared that when the gain of the amplifiers 30, 31 and 32 is increased by any amount, for which a measurement is desired, the same intensity of sound from the loudspeaker 2 will form a holding current for the relay 5 which will fall to a contacting value only when the input falls the same amount that the gain of the amplifiers 30, 31 and 32 is adjusted for, below the initial sound level due to cutting off of the loudspeaker 2.

The device is now ready to proceed with the test. Increase the gain of the amplifiers 30, 31 and 32 by 60 decibels or any amount, for which a measurement, is desired by adjusting the potentiometer 14. Key 12 is then pressed down in order to place a short across the circuit containing the impulse counter 10 through the upper contact of switch 9, when the latter is operated, to prevent operation of the cycle counter 10 during the operation of the horn, until switch 9 is released. Switch 9 is then operated to close a circuit containing the horn 2 and oscillator 1 and completes the short across the circuit containing the impulse counter 10 through the above mentioned contact of key 12. With switch 9 held operated the tone in the room is again brought to a steady state. The sound energy emitted by horn 2 is picked up by the transmitter 4 and is amplified by the amplifiers 30, 31 and 32, 60 decibels or a predetermined amount above that level. This energy is rectified by the rectifier 21 and finally operates relay 5 to open contact 6. When the room has reached the required steady state switch 9 is released which interrupts and short-circuits the input to the loudspeaker 2 and simultaneously removes the short across the cycle counter 10 thus starting its operation. When the sound input to the transmitter 4 has fallen 60 decibels or to a predetermined level, relay 5 contacts closing contact 6. The closing of contact 6 which is in parallel with the cycle counter 10 automatically stops the latter. Knowing the frequency of the power supply used to operate the cycle counter, the time interval may be determined directly from the counter. For instance, should the source of constant frequency alternating current power supply be 60 cycles, then if the pointer on the cycle counter has advanced 60 divisions, the time interval is one second.

Experiment has shown that the acoustical properties of a room cannot be accurately determined by the reverberation time alone because it merely marks a period during which the sound drops a definite amount in intensity. No information whatever is given by it as to the instantaneous relation of sound intensity to time within the period. Rooms in which sound decayed in quite different manners might yield the same reverberation time. The rate of decay is the important factor for it shows what the characteristics of the room under test are and each rate with the range of drop in intensity over which it applies should be given to characterize the room. The amplifiers 30, 31 and 32 controlled by the potentiometer 14 have a variable gain control in steps of 3 decibels which is an important factor in determining these rates of decay. The time required for the original sound to decrease any number of decibels in intensity can therefore be readily obtained by this device so that the curve representing the decrease in sound intensity versus time may be plotted in steps of 3 decibels from the time the tone is stopped until the original intensity has increased 60 decibels.

What is claimed is:

1. In a measuring device, the combination with a source of sound energy, means for de-energizing said sound source, a sound detector for translating sound energy from said source into electric currents, means operative when said currents have decayed to a predetermined value, and means for determining the time of decay of the sound energy to a predetermined lower level, said means comprising a cycle counter, the time of operation of said cycle counter being controlled by said current operative means.

2. In a measuring device, the combination with a source of sound energy, means for deenergizing said sound source, a sound detector for translating sound energy from said source into electric currents, amplifying means for said currents, means operative when said currents have decayed to a predetermined value, means associated with said current operative means for determining the time of decay of the sound to a predetermined lower level, said means comprising a cycle counter, a separate source of energy to operate said cycle counter, means to start said cycle counter operating simultaneously with the de-energizing of said sound source and means comprising said current operative means to control the time of operation of said cycle counter.

3. A measuring device comprising a source of sound, means for de-energizing said sound source, a sound detector for translating sound energy from said source into electric currents, amplifying means for amplifying said electric currents, means for controlling said amplification, means for rectifying said amplified current, means operative when said current has decayed to a predetermined value, means for determining the elapsed time from the de-energizing of said source of sound until said operative means operates, said means comprising a cycle counter, said cycle counter being controlled by said operative means, a separate source of energy to operate said cycle counter, means to start said cycle counter operating simultaneously with the de-energizing of said sound source, said means comprising said de-energizing means.

4. In a measuring device the combination with a source of sound, means for deenergizing said sound source, a sound detector for translating sound energy from said source into electric currents at a predetermined level, adjustable means to amplify said currents to any predetermined higher level, means operative when said currents have decayed to said original level, and means for determining the time of decay to said original level, said means comprising a cycle counter, the time of operation of said cycle counter being controlled by said operative means.

5. In a device for measuring time of reverberation, the combination with a source of sound energy, a sound detector for translating sound energy from said source into electric currents, a relay operative by said electric currents, a switch for energizing and deenergizing said sound source, means comprising a cycle counter associated with and controlled by said relay for determining the time of decay of the sound from one level to a predetermined lower level and means including said switch to start said cycle counter operating simultaneously with the deenergizing of said sound source, said relay releasing when said currents have decayed to said predetermined lower level to stop said cycle counter.

6. In a device for measuring time of reverberation the combination with a source of sound energy, a sound detector for translating sound energy from said source into electric currents, a cycle counter, means operative by said electric currents to condition said counter for operation, switching means for simultaneously energizing said source and rendering said cycle counter inoperative while said source is energized and for simultaneously deenergizing said source and starting said counter, said current operative means stopping said cycle counter when said currents have decayed to a predetermined value.

In witness whereof, I hereunto subscribe my name this 6th day of July, 1931.

FRANCIS L. HOPPER.